(12) United States Patent
Breaux

(10) Patent No.: US 6,379,101 B1
(45) Date of Patent: Apr. 30, 2002

(54) RAMP AND CARGO SYSTEM

(76) Inventor: Gregory K. Breaux, 32 Shenandoah St., Kenner, LA (US) 70065

( * ) Notice: Subject to any disclaimer, the term of this patent is extended or adjusted under 35 U.S.C. 154(b) by 0 days.

(21) Appl. No.: 09/617,051

(22) Filed: Jul. 14, 2000

(51) Int. Cl.[7] .............................................. B65G 67/02
(52) U.S. Cl. ...................... 414/537; 414/921; 224/521
(58) Field of Search ................................ 414/537, 921

(56) References Cited

U.S. PATENT DOCUMENTS

| | | | |
|---|---|---|---|
| 3,158,302 A | 11/1964 | Dickerson | 224/42.43 |
| 3,777,921 A | 12/1973 | Nelson | 214/450 |
| 4,084,713 A | 4/1978 | Rohrs et al. | 214/85 |
| 4,411,580 A | 10/1983 | Kelly | 414/462 |
| 4,438,875 A | 3/1984 | Fritsch | 224/42.03 |
| 4,697,975 A | 10/1987 | Lippold | 414/462 |
| 4,906,015 A | 3/1990 | LaCroix et al. | 280/415.1 |
| 5,033,662 A * | 7/1991 | Godin | 222/42.43 |
| 5,287,579 A * | 2/1994 | Estevez, Jr. | 14/71.1 |
| 5,325,558 A | 7/1994 | Labreche | 14/69.5 |
| 5,368,209 A | 11/1994 | Hill | 224/42.44 |
| 5,586,702 A | 12/1996 | Sadler | 224/521 |
| 5,649,732 A * | 7/1997 | Jordan et al. | 296/26 |
| 5,658,033 A * | 8/1997 | Delaune | 296/26 |
| 5,676,292 A | 10/1997 | Miller | 224/524 |
| 5,853,278 A | 12/1998 | Frantz | 414/462 |
| 5,938,397 A | 8/1999 | Schouest | 414/537 |
| 6,076,215 A * | 6/2000 | Blankenship | 14/71.1 |
| 6,250,874 B1 * | 6/2001 | Cross | 414/537 |

* cited by examiner

Primary Examiner—Steven A. Bratlie
(74) Attorney, Agent, or Firm—Bonnie J. Davis; John H. Runnels

(57) ABSTRACT

A simple, inexpensive ramp and cargo system is described that is easily mounted to a standard trailer hitch socket of a vehicle with a rear door or hatch, including a minivan. The ramp can be used to load small sized wheeled vehicles, including occupied wheelchairs, into the interior of the vehicle. The ramp and cargo system is carried outside the vehicle and does not decrease the interior space of the vehicle. The ramp and cargo system can optionally serve as a deck attached to the rear of the vehicle to provide additional cargo space. This external deck can be expanded and partially enclosed with two platform pieces and sidewalls. The ramp and cargo system is inexpensive, light-weight, easy to install and remove, and easy to deploy as a ramp.

12 Claims, 5 Drawing Sheets

RAMP AND CARGO SYSTEM

This invention pertains to a ramp and cargo system that is easily attached to a standard trailer hitch socket of a vehicle and that can be used to load small-sized, wheeled vehicles, including an occupied wheelchair, into the vehicle through the rear door.

Many new vehicles, such as mini-vans and sport utility vehicles, have a rear opening door or hatch. The interior size of the vehicles allows transporting small-sized, wheeled vehicles, such as all-terrain vehicles, riding lawn mowers, small tractors, motorcycles, and in particular, occupied wheelchairs.

Many of the newer wheelchairs are heavier and bulkier, designed for greater comfort and for the occupant to remain in the wheelchair during transportation. However, these larger, occupied wheelchairs present the problem of how to load into the vehicle. Vehicle wheelchair lifts and ramps have been designed that mount inside the side door of a van and load the wheelchair through the side door. See U.S. Pat. Nos. 4,084,713; and 5,325,558. These ramp systems are stored inside the vehicle and decrease the available interior space. There are also portable ramps that can be used to load an occupied wheelchair into a vehicle. See, e.g., U.S. Pat. Nos. 5,938,397 and 5,325,558. However, these portable ramps are often inconvenient to use and are usually stored inside the vehicle.

Designs exist for carriers for the rear of a vehicle that can transport an unoccupied wheelchair or other cargo outside the vehicle. For example, U.S. Pat. Nos. 4,438,875; 4,411,580; 3,158,302. Some of these rear cargo carriers attach to the rearwardly extending trailer hitch of the vehicle. See, e.g., U.S. Pat. Nos. 5,853,278; 5,586,702; 4,906,015; 4,679,975.

U.S. Pat. No. 3,777,921 describes a ramp used to load small recreational vehicles (e.g., skimobile, snowmobiles, garden tractors) from the rear of a vehicle, including loading into the back of a station wagon. The ramp design for the station wagon extends into the back of the vehicle and is attached to anchors for the rear seat belts.

U.S. Pat. No. 5,676,292 describes a carrier deck attached to a vehicle using a standard trailer hitch, comprising an additional platform piece that can be used to load cargo onto the deck from the the side of the deck. The carrier deck and additional platform piece can be stored in a vertical position when not in use.

I have designed a simple, inexpensive ramp and cargo system that easily and quickly mounts to a standard trailer hitch socket of a vehicle with a rear door or hatch, including minivans and sport utility vehicles. The ramp is used to load small-sized, wheeled vehicles, including occupied wheelchairs, into the interior of the vehicle. The ramp is mounted and carried outside the vehicle, and thus does not decrease the interior space of the vehicle. The ramp and cargo system can also optionally serve as a deck attached to the rear of the vehicle to provide additional cargo space. This external deck can be expanded and partially enclosed with sidewalls. The ramp and cargo system is light-weight, inexpensive, and easy to use compared with existing lift systems.

The purpose of this invention is to provide an inexpensive, light-weight ramp for loading small-sized wheeled vehicles, particularly an occupied wheelchair, into a vehicle through the rear door. The ramp is easy to attach. and once attached is stored outside the vehicle. The ramp and cargo system also can optionally function as a small storage platform. Platform pieces can be added to increase the storage space, and sidewalls can be added to contain the cargo. The ramp and cargo system is preferably of a welded construction, comprising steel or aluminum. In a preferred embodiment, the ramp and platform pieces are made using a perimeter frame with support bars, overlaid with a cross-hatched gridwork. The frame and support bars may be made of angle and tubular steel or aluminum. The wire mesh gridwork may be light-weight steel or aluminum. The sidewalls for the cargo carrier can be of similar gridwork as the platforms, or can be of a lighter material such as molded plastic or fiberglass. The material selected will depend on the weight that will be either rolled up the ramp or carried as cargo.

Figure 1:
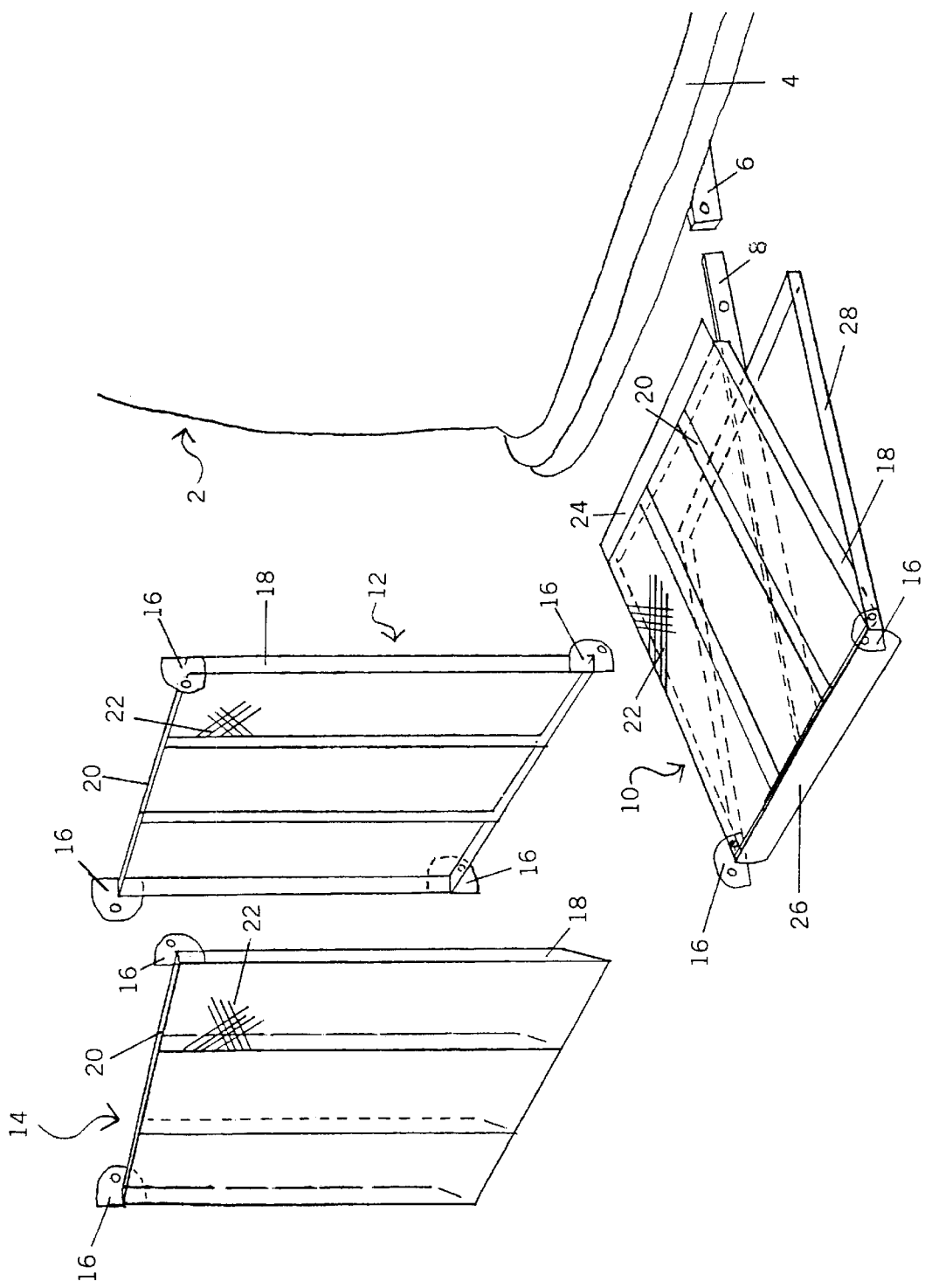
FIG. 1 illustrates a perspective view of the three-piece embodiment of the ramp.

FIGS. 1–5 illustrate the invention. As seen in FIGS. 1–5, this ramp design is for loading wheeled vehicles into a vehicle through the rear door of the vehicle (not shown). The ramp opens directly behind the vehicle and is stored outside the vehicle when not in use. FIG. 1 illustrates a three-piece embodiment of the ramp. In this embodiment, the ramp comprises upper ramp piece 10, middle ramp piece 12, and lower ramp piece 14. Each ramp piece is made using a perimeter frame 18, preferably of angle iron, support bars 20, and top metal gridwork 22 that covers frame 18. The two lower ramp pieces attach to each other using hinges 16 which are designed to provide the proper rotation for each ramp piece. Openings are provided in hinges 16 to permit a fastener to be attached to secure the pieces together. Upper ramp piece 10 fits inside a second larger perimeter frame 28 and hinges at the rear of frame 28. Middle ramp piece 12 hinges to perimeter frame 28 at one end and to lower ramp piece 14 at the other. Attached to upper ramp piece 10 is a front extension 24 that, when upper ramp piece 10 is inclined, may lay on top of bumper 4 of vehicle 2 (Shown in FIG. 2). At the back of frame 28 is a flat bar 26 for support. Frame 18 of lower ramp piece 14 is tapered on the bottom edge to allow a smooth transition from the ground or street onto lower ramp piece 14. The ramp attaches to vehicle 2 at trailer hitch socket 6 by tongue 8, which is welded to frame 28. Tongue 8 is square and fits inside trailer hitch socket 6 such that the holes in trailer hitch socket 6 and tongue 8 align, and the two pieces can be secured with a standard trailer hitch socket securing pin assembly (not shown). When used as a ramp, upper ramp piece 10 is positioned on top of bumper 4 as the ramp is attached to the vehicle by sliding tongue 8 into trailer hitch socket 6. Alternatively, if not needed as a ramp, upper ramp piece 10 can be positioned to lay flat under bumper 4 during attachment to the vehicle. When the ramp is not in use, middle ramp piece 12 and lower ramp piece 14 may be folded to rest on the top of upper ramp piece 10, either in the inclined or flat position.

Figure 2:
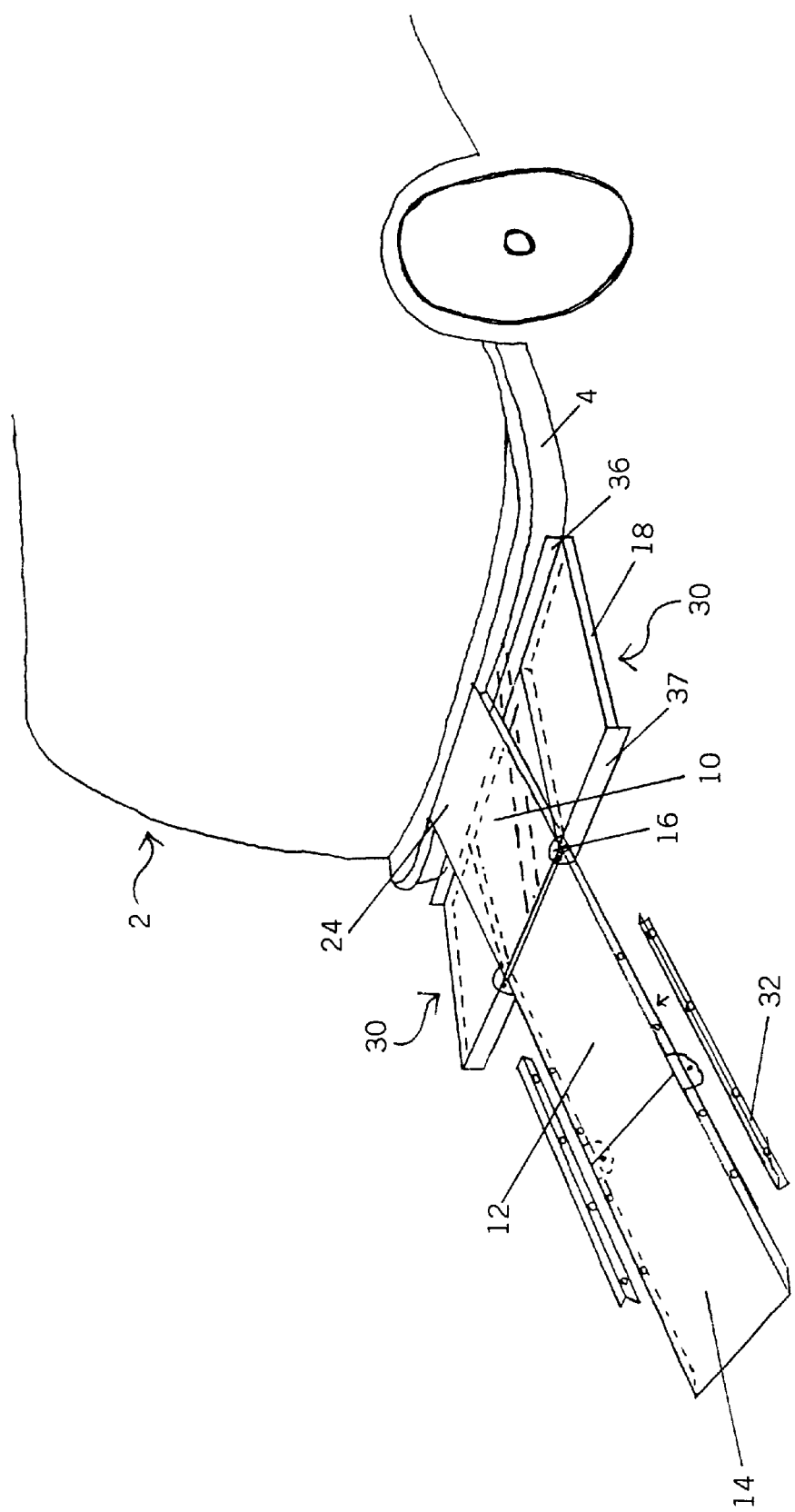
FIG. 2 illustrates a perspective view of the three-piece embodiment of the ramp as deployed and of the optional stiffening rods and platform pieces to increase the deck space.
Figure 3:
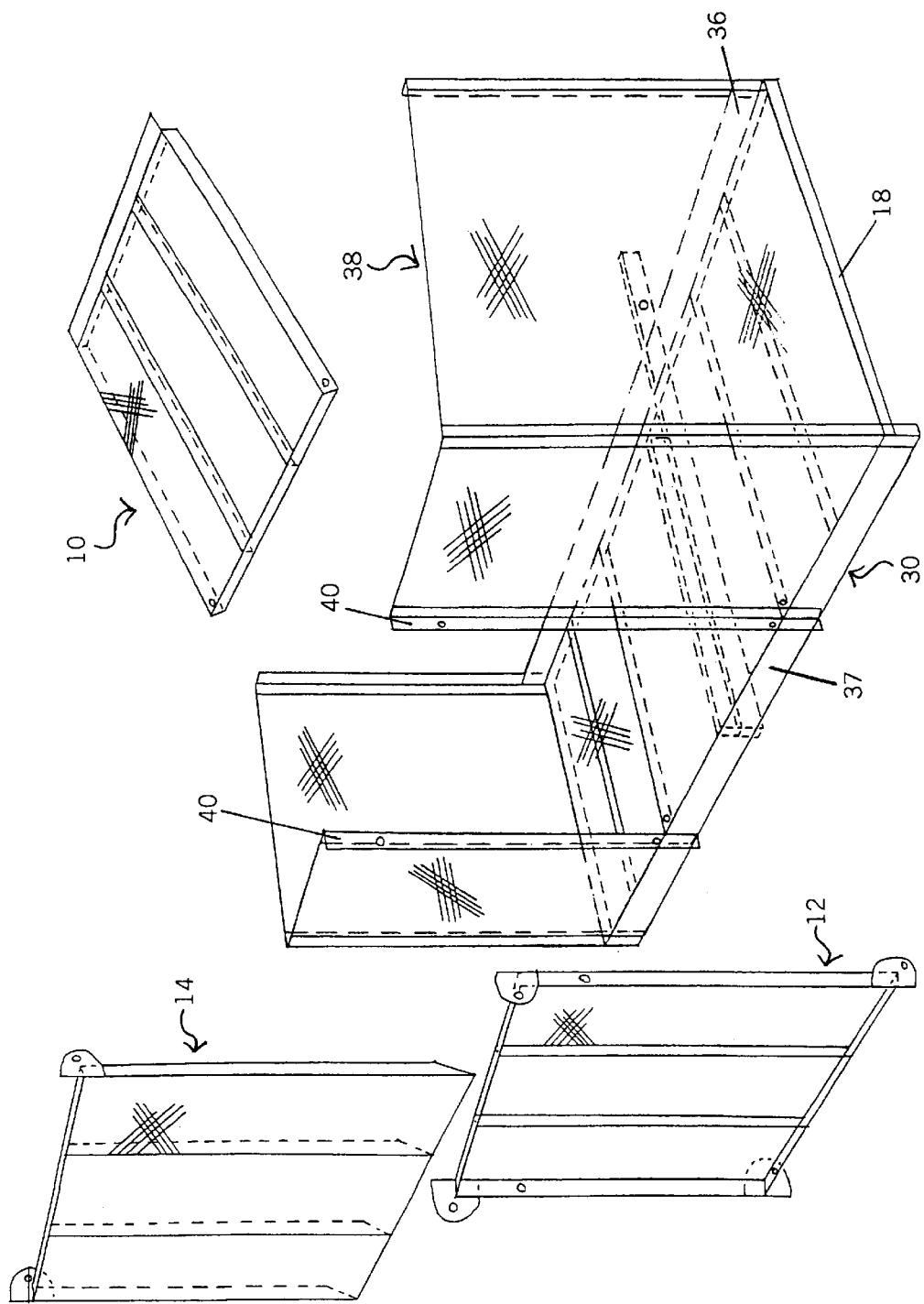
FIG. 3 illustrates the assembly of a cargo carrier comprising the three-piece embodiment of the ramp, two platform pieces, and sidewalls.

FIG. 2 illustrates the three-piece ramp and cargo system attached to a vehicle and deployed for use. Front extension 24 of upper ramp piece 10 rests on bumper 4. Hinges 16 allow the ramp pieces to rotate to the desired position. To load a heavy vehicle, stiffeners 32 can be applied to strengthen the joint between middle ramp piece 12 and lower ramp piece 14. FIG. 2 also illustrates the option of increasing the cargo storage area with two platforms 30, one on each side of upper ramp piece 10. Each platform piece is constructed similarly to the ramp pieces, i.e., as shown in FIG. 3, each platform 30 is supported by perimeter frame 18, support bars 20, and metal gridwork 22. Each platform 30 is secured (e.g., welded, or bolted if removal is desired) to the sides of frame 28. Each platform 30 has a ledge that extends above the horizontal around the outer sides. This ledge helps secure the cargo and adds strength to the platforms. The front ledge for each platform 30 fits slightly under, but essentially flush with bumper 4. For additional support, a front horizontal support bar 36 and a rear horizontal bar 37 may be added across the front and rear of the entire deck (the two platforms 30 and frame 28).

FIG. 3 illustrates the three-piece ramp and cargo system with platform pieces as shown in FIG. 2, with the addition of sidewalls. Each sidewall 38 comprises a front and side section, constructed similarly to the ramp pieces or of lighter materials, and vertical support posts 40. Sidewalls 38 are secured (e.g., welded or bolted if removal is desired) to the frame ledge extensions of platform 30. Vertical support posts 40 serve as attachment sites for the upright storage of middle ramp piece 12 and lower ramp piece 14 when the vehicle is moving. Middle ramp piece 12 and vertical support posts 40 are provided with openings to permit a fastener to be inserted through both to secure them together. Lower ramp piece 14 folds and rests against middle ramp piece 12 when it is secured to vertical support posts 40. Upper ramp piece 10 can either rest on bumper 4 at an incline or it may rest horizontally by being placed under bumper 4 during attachment to trailer hitch socket 6.

Figure 4:
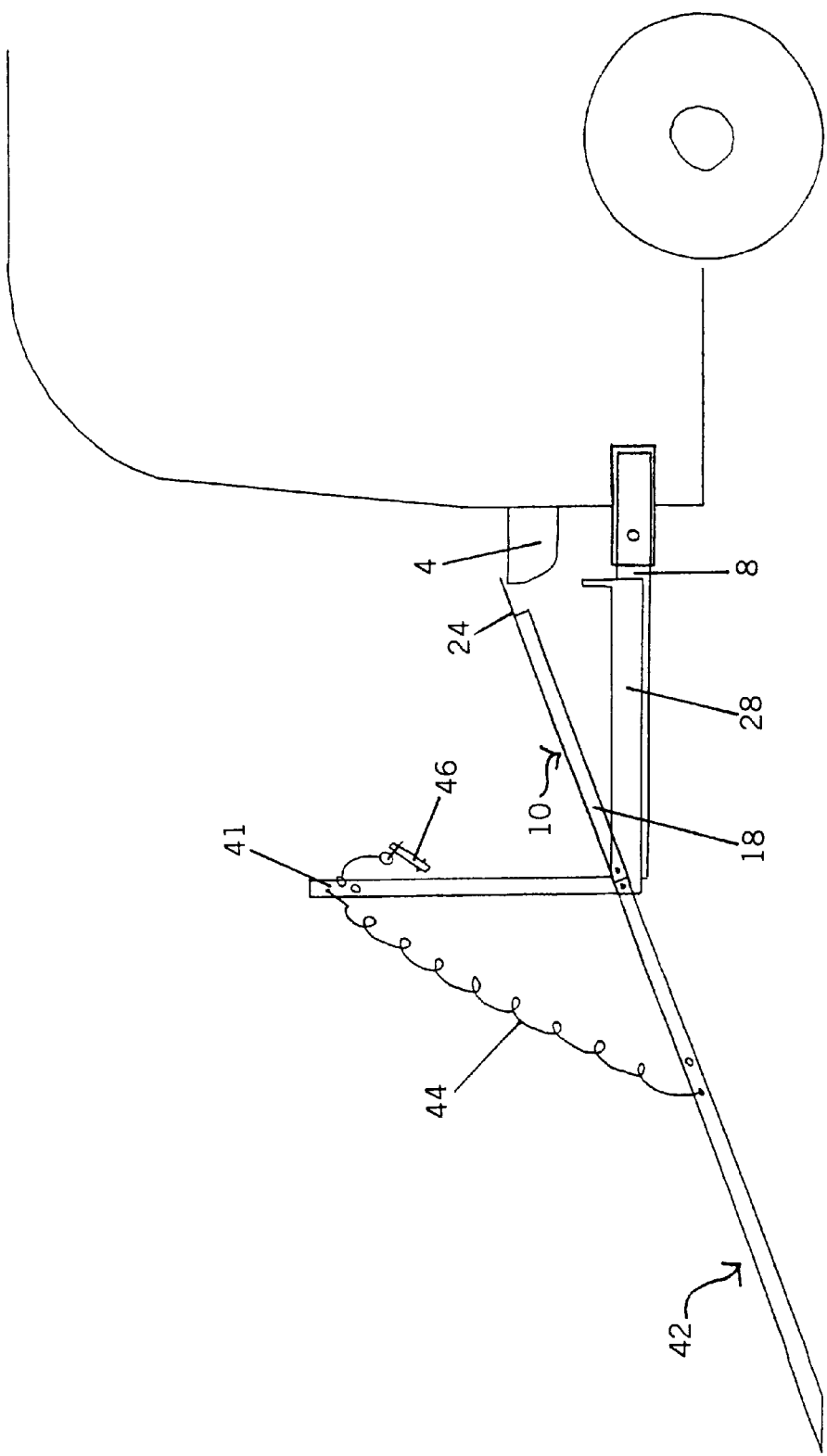
FIG. 4 illustrates a perspective view of the two-piece embodiment of the ramp as deployed.
Figure 5:
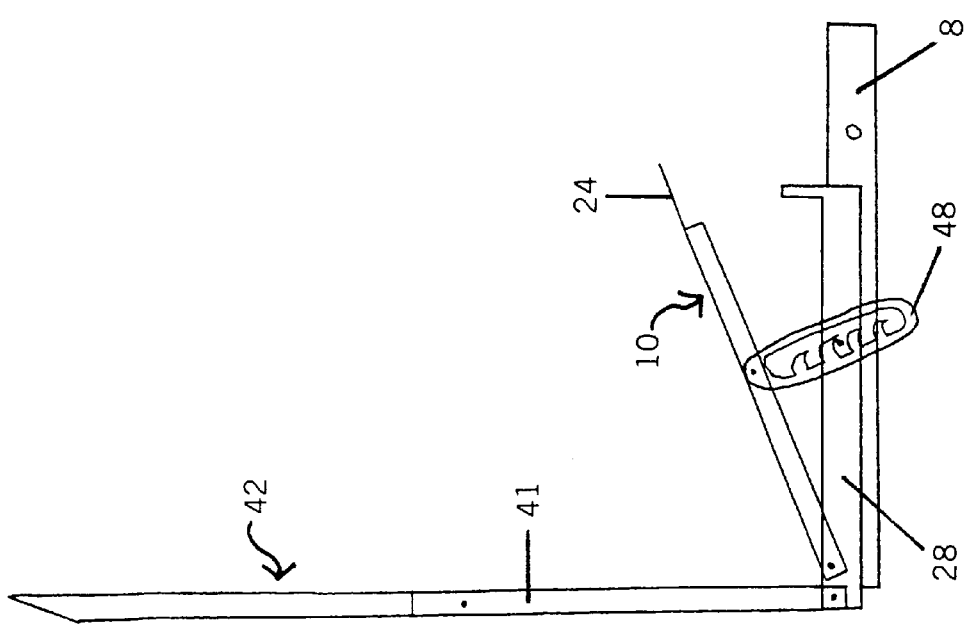
FIG. 5 illustrates a side view of the two-piece embodiment of the ramp as stored and also illustrates an alternative method to incline the upper ramp piece comprising the use of adjustable height supports.

FIG. 4 illustrates a side view of an alternative embodiment in which the ramp comprises two pieces. In this embodiment, rear ramp piece 42, a single piece, replaces middle ramp piece 12 and lower ramp piece 14, and is hinged to upper ramp piece 10. Rear ramp piece 42 is of similar construction to the other ramp and platform pieces. If there are no sidewalls, free-standing vertical support posts 41 are added to store rear ramp piece 42 in a vertical position for transport as shown in FIG. 5. Rear ramp piece 42 is secured with retaining pins 46 to vertical support posts 41. If rear ramp piece 42 is made of a heavy material, optional springs 44 can be attached between rear ramp piece 42 and vertical support posts 41 to assist in lifting the ramp once it is deployed. To this embodiment can be added additional platforms 30 and sidewalls 38, as shown in FIG. 3.

FIG. 5 illustrates an alternative method to incline upper ramp piece 10 in either the two- or three-piece ramp embodiment. Instead of resting on bumper 4, height adjuster 48 is attached to each side of upper ramp piece 10 and to frame 28, such that upper ramp piece 10 can be inclined to various heights depending on the spacing of the teeth structure of height adjuster 48.

The platform, with or without the sidewalls, may be used to carry luggage, wood, camping equipment, coolers, and wide variety of other items. The advantages of the described ramp design are many: (1) the ramp and cargo assembly is easily mounted on any vehicle using an existing trailer hitch socket; (2) the ramp and cargo assembly is lightweight and easy to lower and lift; (3) the ramp may be used by itself or expanded to form a cargo platform; (4) the cargo platform can easily be fitted with sidewalls; (5) the entire assembly is easily and quickly removed from the vehicle which leaves the vehicle in its original condition which improves resale of the vehicle and which allows the assembly to be used on a rental vehicle; (6) the assembly can be easily removed from one vehicle to install on a different vehicle; (7) the assembly takes up no space inside the vehicle; (8) the assembly incorporates no electrical or complex mechanical parts; (9) a wheelchair occupant can be loaded into the vehicle faster than with traditional lift systems, a substantial benefit in adverse weather; and (10) the cost of the assembly is substantially below traditional lift systems.

While the invention has been described with reference to the figures, it will be apparent to those skilled in the art that many adjustments and changes may be made in the details of construction without departing from the spirit and scope of this description.

The complete disclosures of all references cited in this specification are hereby incorporated by reference. In the event of an otherwise irreconcilable conflict, however, the present specification shall control.

I claim:

1. A rearward extending vehicle ramp system for loading and unloading a small-sized wheeled vehicle into a vehicle having a rectangular trailer hitch socket, said ramp system removably attachable to the trailer hitch socket, and said ramp system comprising:
   (a) a mounting bar having a rectangular cross section and having a straight portion terminating in a free end adapted for insertion into the trailer hitch socket, said mounting bar connected to a rectangular ramp base;
   (b) a first ramp member having a free front end portion and a second end portion hingeably mounted to the rectangular ramp base, wherein said free front end portion is adapted to incline up to the motor vehicle interior floor;
   (c) a second ramp member having a front end portion and a second end portion, wherein said front end portion is hingeably mounted to the rectangular ramp base;
   (d) a third ramp member having a front end portion and a free second end portion, wherein said front end portion is hingeably mounted to the second end portion of said second ramp member; the free second end portion of third ramp member adapted to contact the ground surface, when said ramp system is unfolded;
   wherein when said second ramp member and said third ramp member are unfolded, a small-sized wheeled vehicle can move up said ramp system into the motor vehicle.

2. A ramp system as in claim 1, wherein said first ramp member is adapted to incline by resting on a rear bumper of the motor vehicle.

3. A ramp system as in claim 1, wherein said first ramp member is adapted to incline by a mechanical support connected to the rectangular ramp base.

4. A ramp system as in claim 1, additionally comprising platform pieces that attach to sides of the rectangular ramp base, wherein a carrier deck is formed by said platform pieces.

5. A ramp system as in claim 4, additionally comprising sidewalls to partially enclose said carrier deck.

6. A ramp system as in claim 1, wherein said second ramp member and third ramp member are adapted to fold together when the motor vehicle is moving.

7. A rearward extending vehicle ramp system for loading and unloading a small-sized wheeled vehicle into a motor vehicle having a rectangular trailer hitch socket, said ramp system removably attachable to the trailer hitch socket, and said ramp system comprising:

(a) a mounting bar having a rectangular cross section and having a straight portion terminating in a free end adapted for insertion into the trailer hitch socket, said mounting bar connected to a rectangular ramp base;

(b) a first ramp member having a free front end portion and a second end portion hingeably mounted to the rectangular ramp base, wherein said free front end portion is adapted to incline up to the motor vehicle interior floor;

(c) a second ramp member having a front end portion and a second end portion, wherein said front end portion is hingeably mounted to the rectangular base and the free second end portion of second ramp member is adapted to contact the ground surface when the said ramp system is deployed;

wherein when said second ramp member is deployed, a small-sized wheeled vehicle can move up said ramp system into the motor vehicle.

8. A ramp system as in claim 7, wherein said first ramp member is adapted to incline by resting on a rear bumper of the motor vehicle.

9. A ramp system as in claim 7, wherein said first ramp member is adapted to incline by a mechanical support connected to the rectangular ramp base.

10. A ramp system as in claim 7, additionally comprising platform pieces that attach to sides of the rectangular ramp base, wherein a carrier deck is formed by said platform pieces.

11. A ramp system as in claim 10, additionally comprising sidewalls to partially enclose said carrier deck.

12. A ramp system as in claim 7, wherein said second ramp member is adapted to store in an upright position when the motor vehicle is moving.

* * * * *